(12) United States Patent
Markunas et al.

(10) Patent No.: US 8,217,630 B2
(45) Date of Patent: Jul. 10, 2012

(54) ELECTRIC LOAD DAMPER FOR DAMPING TORSIONAL OSCILLATION

(75) Inventors: Albert L. Markunas, Roscoe, IL (US); Vijay K. Madalli, Rockford, IL (US); Donal E. Baker, Rockford, IL (US); John Sagona, Caledonia, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 440 days.

(21) Appl. No.: 12/620,625

(22) Filed: Nov. 18, 2009

(65) Prior Publication Data

US 2011/0115444 A1    May 19, 2011

(51) Int. Cl.
| | |
|---|---|
| H02P 11/00 | (2006.01) |
| H02P 9/00 | (2006.01) |
| H02H 7/06 | (2006.01) |
| B60L 11/02 | (2006.01) |
| B61C 9/38 | (2006.01) |

(52) U.S. Cl. .......................................... 322/36; 290/14
(58) Field of Classification Search .................... 322/36; 290/14

See application file for complete search history.

(56) References Cited

U.S. PATENT DOCUMENTS

| | | | | |
|---|---|---|---|---|
| 2,320,721 A | | 6/1943 | Ericsom ........................ 74/574.1 |
| 3,573,578 A | * | 4/1971 | Shibata .......................... 318/720 |
| 3,611,831 A | | 10/1971 | O'Neill .......................... 74/574.1 |
| 3,999,115 A | | 12/1976 | South et al. ..................... 322/25 |
| 4,292,531 A | * | 9/1981 | Williamson ..................... 290/14 |
| 4,302,715 A | | 11/1981 | Putman et al. ................. 323/210 |
| 4,311,253 A | | 1/1982 | Putman et al. ................. 322/25 |
| 4,330,829 A | | 5/1982 | Fischer et al. .................. 701/12 |
| 4,407,161 A | | 10/1983 | Ferrar ........................ 73/504.06 |
| 5,090,542 A | | 2/1992 | Brunken ....................... 192/208 |
| 5,198,745 A | | 3/1993 | Larsen et al. ................... 322/58 |
| 5,839,962 A | | 11/1998 | Rohs et al. .................. 464/68.41 |
| 5,841,254 A | * | 11/1998 | Balch et al. .................... 318/430 |
| 5,994,859 A | * | 11/1999 | Deng et al. .................... 318/432 |
| 6,019,206 A | | 2/2000 | Rohs et al. .................. 192/213.2 |
| 6,163,121 A | * | 12/2000 | Kumar et al. .................. 318/434 |
| 6,290,620 B1 | | 9/2001 | Tsai et al. ........................ 474/18 |
| 6,441,517 B1 | * | 8/2002 | Brum et al. ..................... 310/37 |
| 6,911,791 B2 | | 6/2005 | Tebbe ............................ 318/114 |
| 7,423,411 B2 | | 9/2008 | Sihler ............................. 322/19 |

(Continued)

OTHER PUBLICATIONS

European Search report dated Dec. 15, 2011.

*Primary Examiner* — Pedro J Cuevas
(74) *Attorney, Agent, or Firm* — Carlson Gaskey & Olds P.C.

(57) ABSTRACT

An electric load damper assembly includes a synchronous generator operable to provide a plurality of phases of electrical output in response to a mechanical input from a rotating shaft. An electric load damper includes a phase leg for each of the plurality of phases. Each phase leg includes a resistive load, a snubber and at least one solid state switch. The at least one solid state switch is in parallel with the snubber, and the at least one solid state switch and snubber are collectively in series with the resistive load. A controller is operable to receive a signal indicative of a rotational speed oscillation of the synchronous generator, and is operable to selectively reduce a torsional oscillation of the shaft by diverting electrical current from the synchronous generator through the resistive load of each of the plurality of phases in response to the signal exceeding a predefined threshold.

19 Claims, 5 Drawing Sheets

U.S. PATENT DOCUMENTS

| | | | |
|---|---|---|---|
| 7,479,091 B2 * | 1/2009 | Yang | 477/108 |
| 7,900,455 B2 * | 3/2011 | Althaus et al. | 60/727 |
| 7,948,197 B2 * | 5/2011 | Shackelford, IV | 318/611 |
| 8,087,484 B2 * | 1/2012 | Seel et al. | 180/65.265 |
| 2002/0108251 A1 * | 8/2002 | Brum et al. | 30/43.7 |
| 2007/0037661 A1 * | 2/2007 | Yang | 477/115 |
| 2008/0000233 A1 * | 1/2008 | Althaus et al. | 60/659 |
| 2008/0203949 A1 * | 8/2008 | Shackelford | 318/15 |
| 2008/0254936 A1 * | 10/2008 | Yang | 477/5 |
| 2009/0001940 A1 | 1/2009 | Sihler et al. | 322/58 |
| 2009/0009129 A1 | 1/2009 | Markunas et al. | 318/702 |
| 2009/0034038 A1 * | 2/2009 | Torashima et al. | 359/198 |
| 2009/0132108 A1 * | 5/2009 | Seel et al. | 701/22 |
| 2011/0197680 A1 * | 8/2011 | Shackelford, IV | 73/650 |

* cited by examiner

ELECTRIC LOAD DAMPER FOR DAMPING TORSIONAL OSCILLATION

BACKGROUND OF THE INVENTION

This application relates to damping torsional oscillation, and more specifically to an electric load damper for damping torsional oscillation.

Synchronous generators are used in a variety of applications to convert mechanical energy provided by an engine to alternating current ("AC") electrical energy. One example application for a synchronous generator is a gas turbine engine for an aircraft, in which the generator generates AC electrical energy to operate on-board electrical systems.

A gas turbine engine may be used to generate mechanical energy that is provided through a gearbox along a shaft to one or more synchronous generators. Due to a multitude of competing mechanical design considerations, the shaft may be relatively long and mechanically compliant. The inertias associated with the engine, the gearbox, the one or more synchronous generators, and other gearbox driven accessories in combination with the mechanical compliance or spring rates of the mechanical drive train, including the generator shaft, may create a distributed mechanical spring-mass system that exhibits torsional oscillation.

Engine gearboxes may exhibit lightly damped characteristics, resulting in overall negative damping when coupled to a high power generator or generators due to their electromechanical torque characteristics for disturbance frequencies that are within the generator's voltage regulation bandwidth. In certain situations, depending on factors such as generator speed, generator electrical load, and net effective damping in the overall mechanical drive train, the torsional resonance of the spring-mass system involving the generator or generators can lead to large, undesirable torsional oscillations and mechanical failures in the system. Although mechanical damping may be used to offset the negative damping characteristic of the synchronous generator or generators and thus dampen the torsional oscillations in the spring-mass system, mechanical damping requires additional hardware and mechanical components that can increase the weight and cost of a system.

SUMMARY OF THE INVENTION

An electric load damper assembly includes a synchronous generator operable to provide a plurality of phases of electrical output in response to a mechanical input from a rotating shaft. An electric load damper includes a phase leg for each of the plurality of phases. Each phase leg includes a resistive load, a snubber, and at least one solid state switch. The at least one solid state switch is connected in parallel with the snubber. The at least one solid state switch and snubber are collectively connected in series with the resistive load. A controller is operable to receive a signal indicative of a rotational speed oscillation of the synchronous generator, and is operable to selectively reduce a torsional oscillation of the shaft by diverting electrical current from the synchronous generator through the resistive load of each of the plurality of phases in response to the signal exceeding a predefined rotational speed oscillation threshold.

A method of damping torsional oscillation is also disclosed.

In another feature, the rotating shaft corresponds to an aircraft gas turbine engine.

These and other features of the present invention can be best understood from the following specification and drawings, the following of which is a brief description.

DETAILED DESCRIPTION OF THE PREFERRED EMBODIMENT

Figure 1:
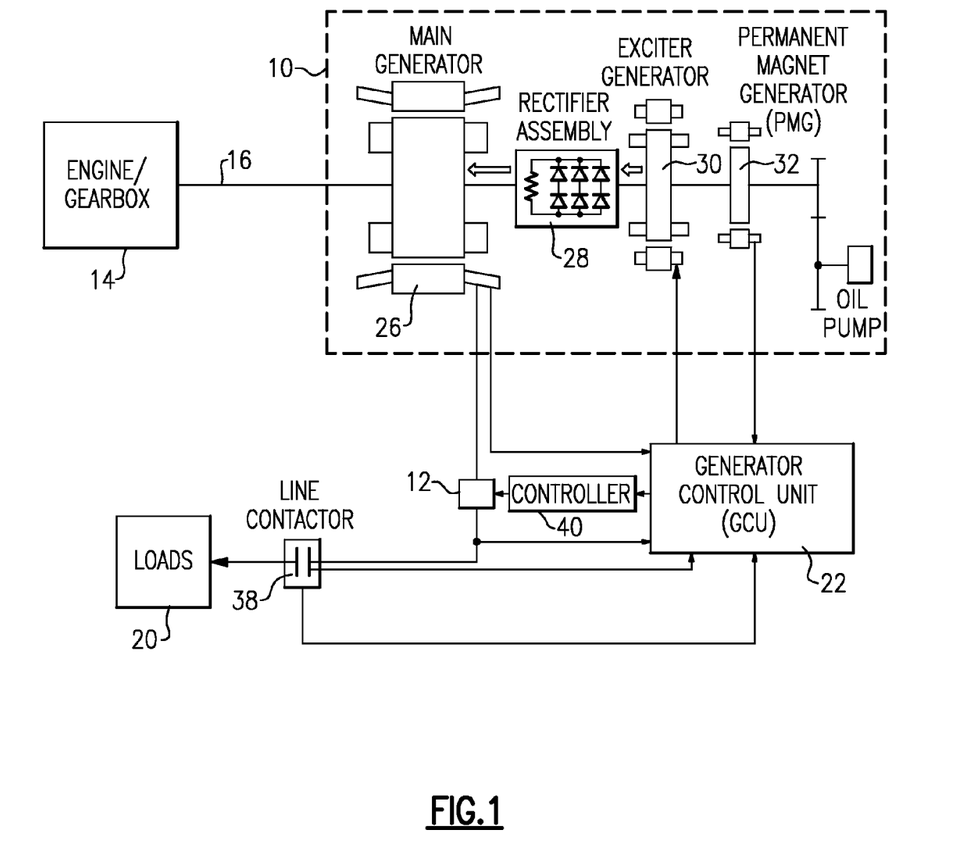
FIG. 1 schematically illustrates a gas turbine engine drive schematic for a synchronous generator that utilizes a load damper.

FIG. 1 schematically illustrates a drive schematic for a synchronous generator 10 that utilizes a load damper 12. An engine/gear box 14 transmits rotating mechanical power along a shaft 16 to the synchronous generator 10. The generator 10 uses the mechanical power to generate an electrical output to one or more aircraft loads 20. A generator control unit ("GCU") 22 monitors the output voltage of the generator 10 and adjusts the voltage to an exciter generator 30 to maintain a desired output voltage.

The synchronous generator 10 includes a main generator 26, a rotating rectifier assembly 28, the exciter generator 30, and a permanent magnet generator ("PMG") 32. The main generator 26, exciter 30, and PMG 32 are electrical machines that are either on the shaft 16 or are connected through a gear ratio to the shaft 16. In response to the mechanical power provided by the shaft 16, PMG 32 generates a 3-phase alternating current ("AC") output voltage that the PMG 32 provides to the GCU 22. Circuitry included within GCU 22 rectifies the three-phase AC voltage to a direct current ("DC") value, and then regulates the DC value to a desired magnitude that is provided as an excitation voltage to exciter 30. GCU 22 regulates the magnitude of the excitation voltage based on monitoring the output three-phase AC voltage generated by main generator 26.

Figure 2:
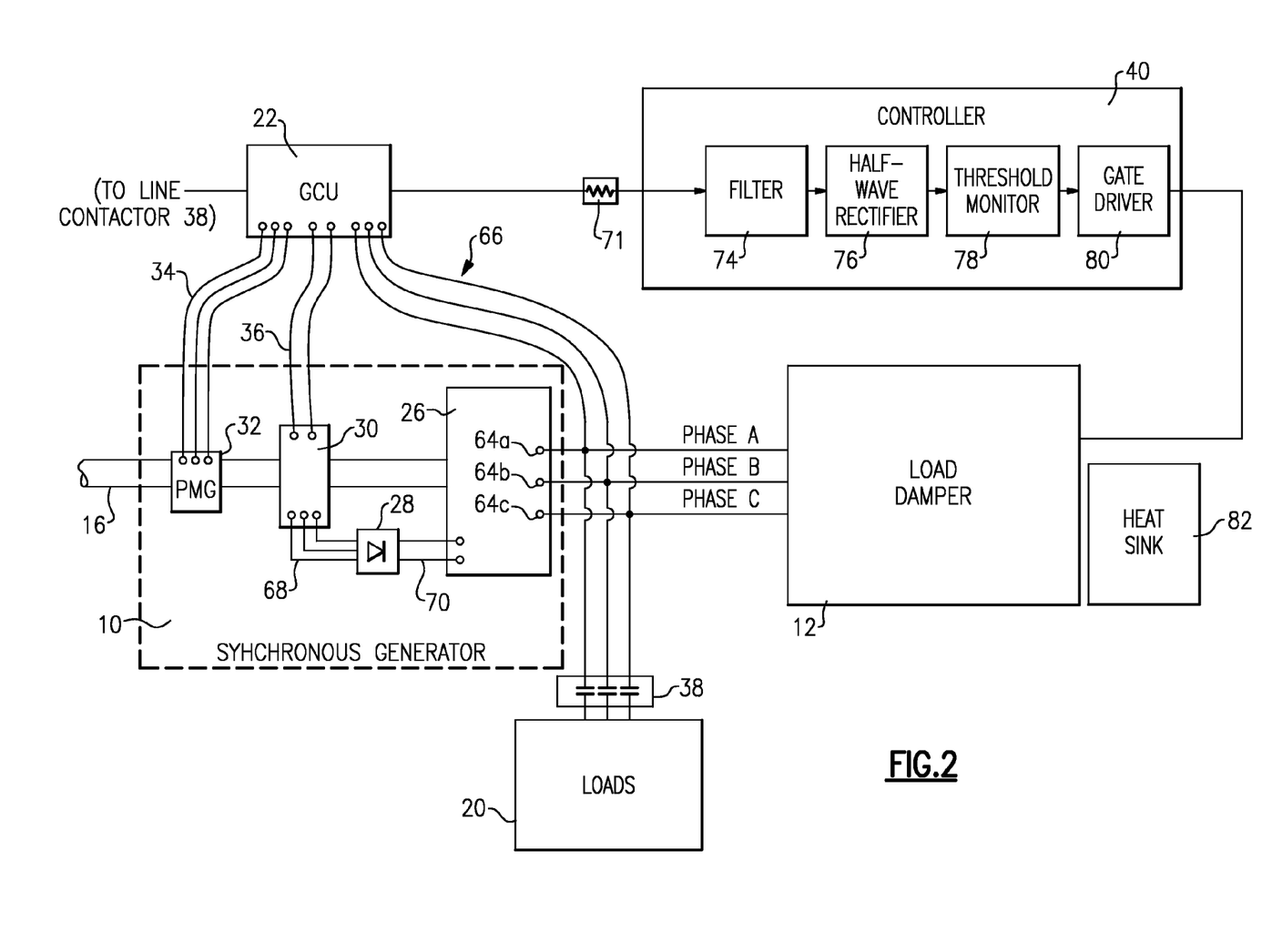
FIG. 2 schematically illustrates a control configuration for the load damper.

FIG. 2 illustrates electrical connections of the drive schematic of FIG. 1 in greater detail. Power leads 64a-c connect three-phase electric power from synchronous generator 10 to the loads 20 and to the electrical load damper 12. Voltage sense lines 66 provide voltage signals to GCU 22 for voltage regulation and protection purposes. PMG 32 provides three-phase electric power to GCU 22 through PMG leads 34. GCU 22 converts the three-phase electrical power provided by PMG leads 34 to DC electric power, modulates the level of DC power in response to GCU 22 voltage regulation and protection functions, and returns this DC power to the field terminals of exciter 30 via exciter field leads 36. Exciter 30 supplies three-phase electric output power through exciter leads 68 to rotating rectifier 28, which in turn provides DC excitation power through generator field leads 70 to the field of main generator 26.

At certain rotational speeds, components of the engine 10 (e.g., shaft 16) may experience unacceptable levels of torsional oscillation that exceed a predefined acceptable threshold of torsional oscillation. If such torsional oscillation is not addressed, the torsional oscillation can reduce the life of certain parts (e.g. engine/gearbox 14) or cause those parts to fail.

A controller 40 is operable to detect torsional oscillation in the signal 71 from the GCU 22, and is operable to determine if the detected oscillation exceeds a predefined rotational speed oscillation threshold. If the generator 10 experiences oscillation, the frequency of the three phases A-C (see leads 64-c) would vary, as the generator 10 rotational speed varies. The varying rotational speed of the generator 10 would have a constant portion and an oscillating signal superimposed on the constant portion. The signal 71 corresponds to the extracted oscillating signal of the generator 10 rotational speed signal.

The controller 40 includes a filter 74, a half-wave rectifier 76, a threshold monitor 78, and a gate driver 80. The filter 74 is operable to change a gain or phase of the input signal 71 from the GCU 22. The half-wave rectifier 76 removes a negative portion of the input signal 71, leaving only the positive portion. By using filter 74 (e.g., a high pass filter) and half-wave rectifier 76 to reject a steady or DC frequency, the threshold monitor 78 could use this filtered frequency signal to detect generator speed oscillations indicative of torsional oscillations. In one example, the threshold monitor 78 verifies (1) that a torsional oscillation exceeds the predefined acceptable threshold of torsional oscillation such that active damping is needed, and (2) that the load damper 12 is still capable of absorbing additional energy without thermally damaging the resistive load 52 and without causing the resistive load 52 to fail. If both of these conditions are true, the controller 40 commands gate driver 80 to divert electrical current from the generator 26 through a plurality of resistive loads (see FIGS. 3a-b) within damper 12 to damp the torsional oscillation. By using filter 74 to establish an appropriate gain and phase compensation, the controller 40 can establish a proper phase relationship between the duty cycle of the switches 56, 58 and the sensed rotor speed oscillations of generator 10 such that positive mechanical damping is provided and torsional oscillations are damped out. In one example the filter 74 is selected such that the load damper 12 is broadband over a wide frequency range (e.g. 20-40 Hz), and as such the load damper 12 could be applied to a variety of different gas turbine engine gearbox applications.

Figure 3A:
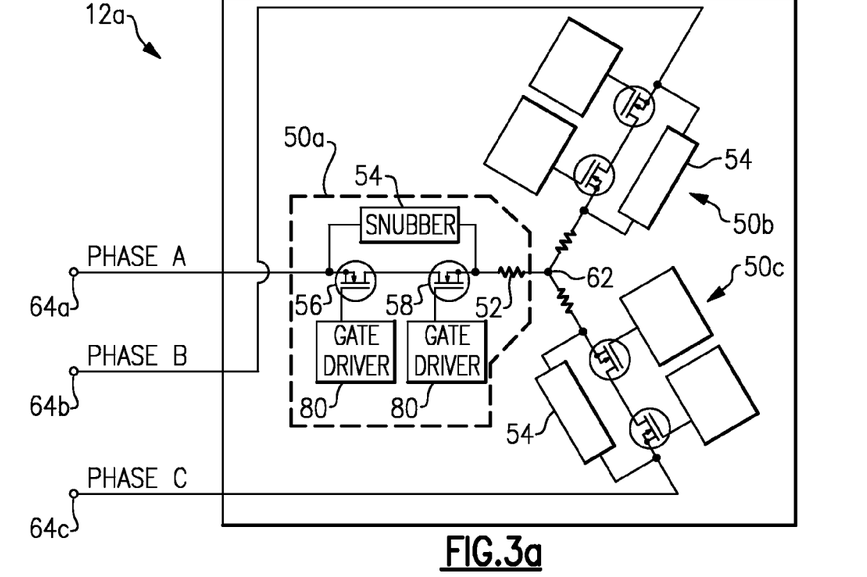
FIG. 3a schematically illustrates an example electric load damper.

FIG. 3a schematically illustrates an example damper 12a that may be used to damp torsional oscillation. The load damper 12a includes a plurality of phase legs 50, each corresponding to one of a plurality of phases of AC current (see leads 64a-c). Referring to phase leg 50a, the phase leg includes a resistive load 52, a snubber 54, a first solid state switch 56 and a second solid state switch 58. The snubber 54 is operable to diminish electromagnetic interference ("EMI"). The solid state switches 56, 58 are connected in parallel with the snubber 54. The snubber 54 and switches 56, 58 are collectively connected in series with the resistive load 52. The switches 56, 58 are oriented to prevent a flow of current when in an OFF state. In one example of FIGS. 3a-b, the switches 56, 58 are MOSFETs, and a drain of the switch 56 is connected in series to a drain of the second switch 58 to prevent a flow of current when in the OFF state. However, other switches could be used, such as IGBTs with diodes, or other solid state switches.

Figure 3B:
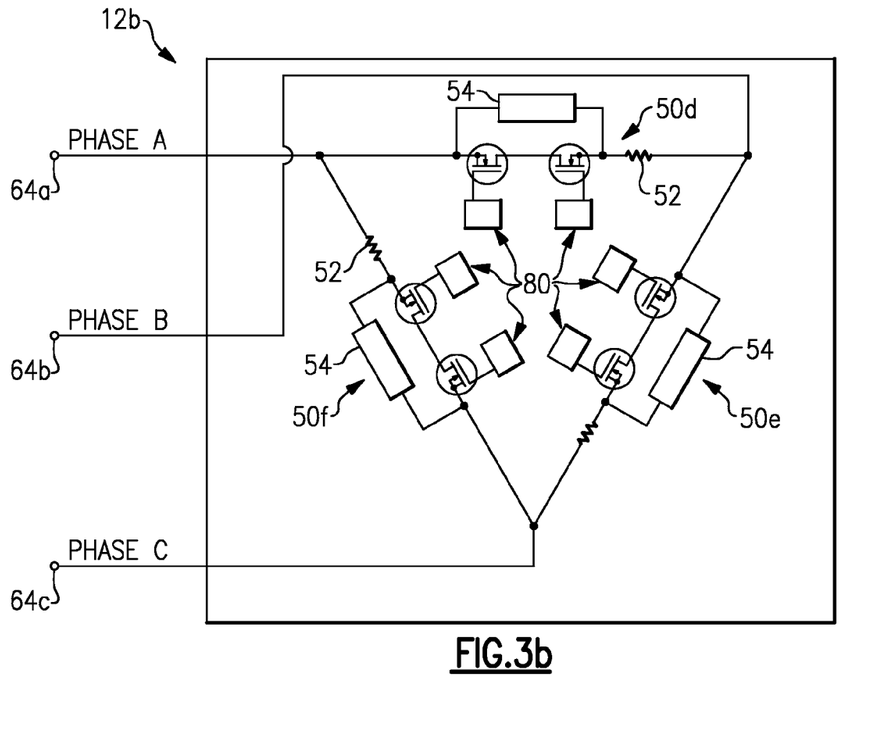
FIG. 3b schematically illustrates another example second load damper.

The gate driver 80 controls each switch 56, 58 to turn ON or OFF. When the gate driver 80 turns switches 56, 58 ON, current is diverted from the synchronous generator 10 through the damper 12. When the gate driver 80 turns switches 56, 58 OFF, no current flows through the resistive loads 52. In one example, the switches 56, 58 of each phase leg 50a-c are connected to a single gate driver 80 that turns the switches 56, 58 of each phase leg ON or OFF simultaneously. Of course, multiple gate drivers 80 could be used, and different switch timing could also be used. The plurality of load damper phase legs 50 and one or more of the gate drivers 50 are configured to minimize the deleterious effects of harmonics on the electrical power quality of the electric power system. These harmonics can arise from variable duty cycle switching of the resistive loads 52.

In the example of the damper 12a, each resistive load 52 is connected to a common node 62, such that the phase legs 50a-c are Y-connected. In the example of the damper 12b of FIG. 3b, however, the phase legs 50d-f are connected such that each resistive load 52 at an output of a phase leg 50 is connected to an input of a subsequent phase leg 50, and such that the phase legs 50d-f are delta-connected. Thus, in FIG. 3b, resistive load 52 of phase leg 50d is connected to an input of phase leg 50e, etc.

The controller 40 is operable to control a duty cycle of the resistive loads 52. The term duty cycle refers to an amount of time that the switches 56, 58 controlling current to each resistive load 52 are ON (e.g. duty cycle of "0" means switches 56, 58 are always OFF, duty cycle of "1" means switches 56, 58 are always ON). By diverting electrical current from the synchronous generator 10 through the resistive loads 52, the controller 40 can dynamically modify the duty cycle of the switches 56, 58 controlling current to the resistive loads 52 such that the torque associated with the generator 10 (e.g., torque of shaft 16) is selectively varied. The amount of damping provided by the resistive loads 52 is proportional to the duty cycle of the switches 56, 58. By selectively controlling the resistive loads 52 to vary torque in proper phase relationship to the generator speed oscillations, the load damper 12 provides active, positive damping that dampens or reduces the torsional oscillations in the generator 10.

The controller 40 and resistive loads 52 are configured to provide half-cycle damping. That is, the switches 56, 58 controlling current to the resistive loads 52 are only turned ON during a positive half cycle of the signal 71. Thus, during periods of time when the sensed rotational speed oscillations are positive, the switches 56, 58 controlling current to the resistive loads 52 may be turned ON and thus may have a duty cycle that may vary from 0 (no damping) to 1 (full damping). During periods of time when the sensed rotational speed oscillations are negative, the switches 56, 58 controlling current to the resistive loads 52 are OFF and have a duty cycle of zero. For normal operation with a low level of oscillations below the predefined rotational speed oscillation threshold, the duty cycle of the switches 56, 58 would be zero or very nearly zero. That is, the switches 56, 58 would only be turned ON for a small portion of a positive half-cycle, if at all. For conditions with a significant level of oscillations present in the signal indicative of speed oscillations (exceeding the predefined rotational speed oscillation threshold), the duty cycle of the switches 56, 58 could be increased in phase with the sensed rotational speed oscillations during periods of time when the sensed speed oscillations are positive or the actual generator speed is transiently above a short-term average generator speed. Thus, during periods of increased oscillations, the switches 56, 58 could have a higher duty cycle such that the switches 56, 58 are turned ON for a greater portion of the positive half-cycle.

A heat sink 82 removes heat from the resistive loads 52 to prevent the resistive loads 52 from experiencing thermal failure, as the electric power dissipated in the resistive loads 52 ends up as heat. The heat sink 82 may correspond, for example, to a forced or natural convective air cooling or a circulating liquid cooling loop. Of course, other heat sinks 82 could be used.

Figure 4:
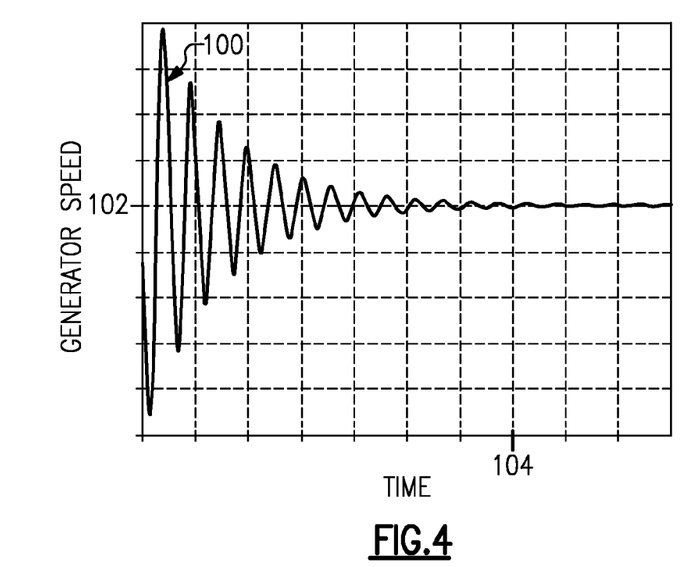
FIG. 4 is a graph showing the effect of load damping on generator rotational speed.

FIG. 4 is a graph showing the effect of the load damper 12 on generator rotational speed. As shown in FIG. 4, a generator rotational speed 100 varies from a desired rotational speed 102. In one example the desired rotational speed 102 could be 7,400 revolutions per minute ("RPMs"). Of course, other desired rotational speeds would be possible. As load damping is applied, oscillations in rotational speed 100 reduce until a point in time 104 when the rotational speed is effectively operating in a steady state. The threshold monitor 78 of controller 40 could be configured to only provide load damping if the rotational speed exceeded the predefined rotational speed oscillation threshold. Of course, what constitutes an acceptable level of torsional oscillation could be application-specific, and thus the speed oscillation threshold could vary between applications.

Figure 5:
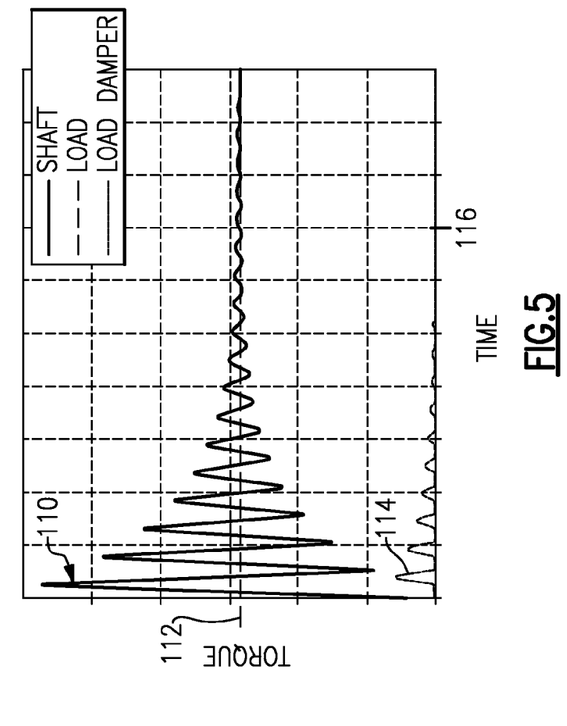
FIG. 5 is a graph showing the effect of damping on torsional oscillation.

FIG. 5 is a graph showing the effect of the load damper 12 on torsional oscillation. As shown in FIG. 5, a shaft speed 110 (e.g., torque of shaft 16) exhibits torsional oscillation and differs from a desired load torque 112. The shaft torque 110 oscillation is not in phase with the rotational speed 100 oscillation of FIG. 4, but leads it by very nearly 90 degrees due to the physics of the second order mechanical torsional oscillations. As load damping 114 is applied, torsional oscillations decrease until at a time 116 the shaft torque 110 is effectively the same as the load torque 112. The load damping 114 is applied only during positive half cycles of the rotational speed 100 oscillation, and is applied properly phased relative to speed oscillations 100 through phase compensation of filter 74, thereby damping the torsional oscillations.

Also, in the example of FIG. 5, a ratio of a magnitude of a torque from load damping 114 from the resistive load to a magnitude of shaft torque 110 oscillation of the rotating shaft is approximately 1/10, such that as the shaft torque 110 diminishes the magnitude of applied load damping 114 is also reduced. Of course, other ratios could be used depending on how fast the torsional oscillations are desired to be damped out, and/or how much power can be safely dissipated by the heat sink 82.

Figure 6:
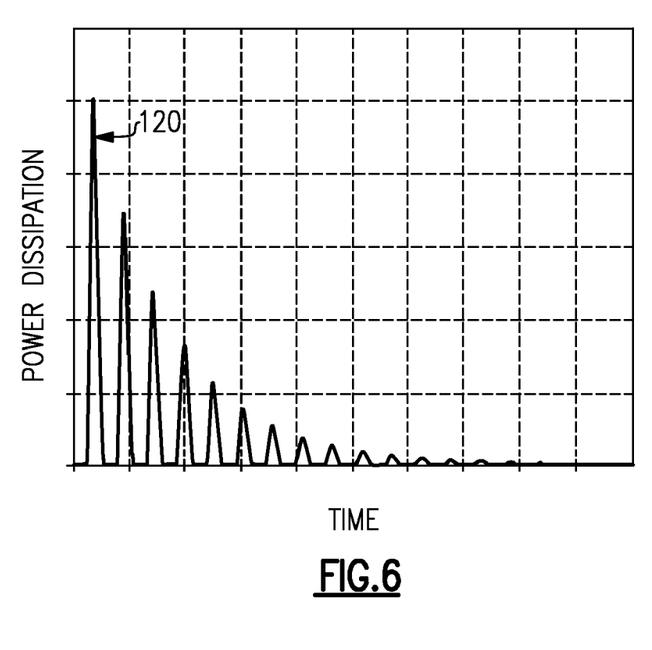
FIG. 6 is a graph showing the effect of load damping on power dissipation.
Figure 7:
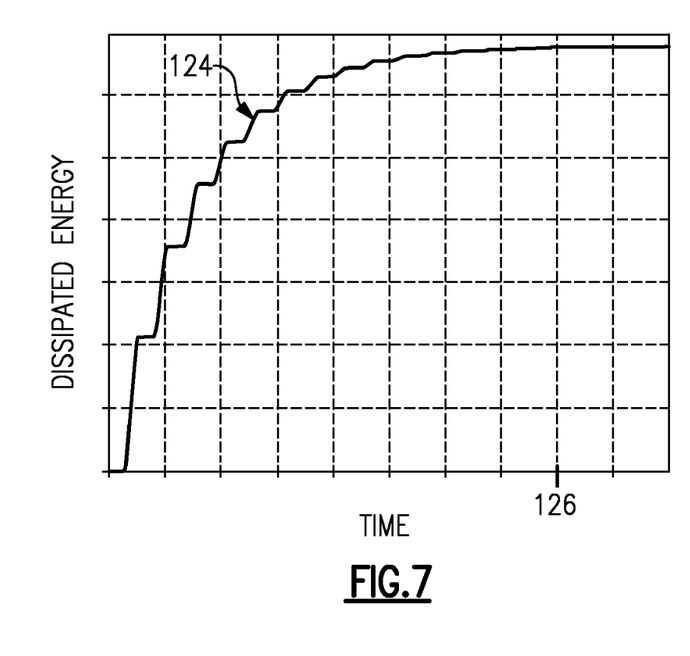
FIG. 7 is a graph showing the effect of load damping on energy dissipation.

FIG. 6 is a graph showing the power 120 dissipated by the load damper 12. As shown in FIG. 6, as load damping is reduced over time, the amount of power dissipated by the load damper is also reduced. FIG. 7 illustrates an amount of energy 124 dissipated by the load damper 12. The amount of dissipated energy 124 corresponds to an area under the power dissipation 120 curve in FIG. 6. As load damping is reduced, the dissipated energy 124 reaches a steady level and eventually stops increasing at approximately a time 126.

In some applications (e.g., aircraft operation) it is possible that damping would be critical, and that redundancy would be required to meet reliability requirements. In such an application, the load damper 12 could be used as a redundant backup for another source of mechanical or electrical load damping. For example, the load damper 12 could be configured to act as a backup damper to the electrical load damper described in co-pending U.S. patent application Ser. No. 11/824,659 entitled "Active Damping for Synchronous Generator Torsional Oscillations." In one example, the load damper 12 and associated controller 40 could be configured to be retrofitted to supplement or replace a mechanical load damper in an existing aircraft.

Although the damping, resistive loads 52 have been described as corresponding to resistors (see FIGS. 3a-b), it is understood that other loads could be used to provide an active damping function. Using the example of an aircraft, other example loads could include a resistive anti-ice circuit, a battery charger, and a galley. Thus, a load could be chosen such that by providing damping, the resistive load would also be providing another useful function (e.g., melting ice, charging a battery, etc.). Also, although the generator 10 has been described as being three phase, and the damper 12 has been described as having three phase legs 50a-c, it is understood that other quantities of phases could be used.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. An electric load damper assembly, comprising:
    a synchronous generator operable to provide a plurality of phases of electrical output in response to a mechanical input from a rotating shaft;
    an electric load damper including a phase leg for each of the plurality of phases, each phase leg comprising:
        a resistive load;
        a snubber; and
        at least one solid state switch connected in parallel with the snubber, the at least one solid state switch and snubber being collectively connected in series with the resistive load; and
    a controller operable to receive a signal indicative of a rotational speed oscillation of the synchronous generator, and operable to selectively reduce a torsional oscillation of the shaft by diverting electrical current from the synchronous generator through the resistive load of each of the plurality of phases in response to the signal exceeding a predefined rotational speed oscillation threshold.

2. The assembly of claim 1, wherein the resistive loads for each of the plurality of phases are connected to a common node, and an input of each phase leg of the electric load damper is connected to one of the plurality of phases, such that the phase legs are Y-connected.

3. The assembly of claim 1, wherein each of the plurality of phases of current is connected to an input of a first phase leg of the electric load damper and an output of a second phase leg of the electric load damper, such that the phase legs are delta-connected.

4. The assembly of claim 1, wherein the at least one solid state switch includes a first MOSFET and a second MOSFET, the first MOSFET and the second MOSFET being oriented to prevent a flow of current when in an OFF state.

5. The assembly of claim 4, wherein a drain of the first MOSFET is connected in series to a drain of the second MOSFET.

6. The assembly of claim 1, wherein the controller diverts electrical current from the synchronous generator through each resistive load by turning ON the at least one solid state switch for each of the phase legs.

7. The assembly of claim 1, wherein the controller only turns the at least one solid state switch ON during positive half cycles of the signal.

8. The assembly of claim 4, wherein the controller stops turning the at least one solid state switch ON during positive half cycles of the signal when the oscillations no longer exceed the predefined rotational speed oscillation threshold.

9. The assembly of claim 1, further comprising a heat sink operable to dissipate heat generated by each resistive load.

10. The assembly of claim 1, further comprising a generator control unit operable to provide excitation energy to the synchronous generator, and operable to provide the signal indicative of a rotational speed oscillation of the synchronous generator to the controller.

11. A method of damping torsional oscillation, comprising:
receiving a signal indicative of a rotational speed oscillation of a synchronous generator, the synchronous generator being driven by a rotating shaft; and
diverting electrical current from each of a plurality of phases of the synchronous generator through a plurality of resistive loads, each resistive load corresponding to one of the plurality of phases to reduce a torsional oscillation of the shaft in response to the oscillations exceeding a predefined rotational speed oscillation threshold.

12. The method of claim 11, wherein said step of diverting electrical current is selectively repeated until the oscillations are within the predefined rotational speed oscillation threshold.

13. The method of claim 11, wherein said step of diverting electrical current is only performed during positive half cycles of the signal.

14. The method of claim 11, wherein said step of diverting electrical current is only performed in response to a determination that the resistive load has the capacity to absorb additional energy.

15. The method of claim 11, further comprising:
dissipating heat from the resistive load through a heat sink.

16. An aircraft torsional oscillation damping system, comprising:
a gas turbine engine having at least one rotating shaft;
at least one synchronous generator operable to provide a plurality of phases of electrical output in response to a mechanical input from a rotating shaft;
at least one electric load damper, each of the at least one synchronous generators having an associated electric load damper, the at least one electric load damper including a phase leg for each of the plurality of phases, each phase leg comprising:
a resistive load;
a snubber; and
at least one solid state switch in parallel with the snubber, the at least one solid state switch and snubber being collectively in series with the resistive load; and
a controller operable to receive a signal indicative of a rotational speed oscillation of the synchronous generator, and operable to selectively reduce a torsional oscillation of the shaft by diverting electrical current from the synchronous generator through the resistive load of each of the plurality of phases in response to the signal exceeding a predefined rotational speed oscillation threshold.

17. The assembly of claim 16, wherein the controller only diverts electrical current from the synchronous generator through the resistive load during positive half cycles of the signal.

18. The assembly of claim 16, further comprising a generator control unit operable to provide excitation energy to the synchronous generator, and operable to provide the signal indicative of a rotational speed of the synchronous generator to the controller.

19. The assembly of claim 16, wherein the electric load damper and the controller are configured to supplement or replace a mechanical load damper in an aircraft.

* * * * *